United States Patent [19]
Burgess

[11] 3,815,814
[45] June 11, 1974

[54] ATOMIZER INTERRUPTER

[75] Inventor: Jack Ashley Burgess, Greenville, S.C.

[73] Assignee: J. P. Stevens & Co., Inc., New York, N.Y.

[22] Filed: June 22, 1973

[21] Appl. No.: 372,739

Related U.S. Application Data

[63] Continuation-in-part of Ser. No. 213,396, Dec. 29, 1971, abandoned.

[52] U.S. Cl. ................................ 236/44 R, 236/46
[51] Int. Cl. .......................................... G05d 22/02
[58] Field of Search ................. 236/44 R, 44 B, 46; 91/356; 137/624, 14

[56] References Cited
UNITED STATES PATENTS
2,562,375   7/1951   Buensod .......................... 236/46 X

*Primary Examiner*—William E. Wayner
*Attorney, Agent, or Firm*—Robert Ames Norton; Michael T. Frimer; Saul Leitner

[57] ABSTRACT

A timed atomizer interrupter in series with a humidistat control interrupter for humidity control of rooms and other spaces controls the periods during which water is sprayed to control humidity. The present invention deals primarily with the timed interrupter. Air from a conventional humidistat passes through an electropneumatic valve to a pressure control device of conventional design. The flow of air is through a restriction which determines the time during which air pressure builds up in the pressure switch. When the switch closes, the electro-pneumatic valve disconnects air from the humidistat and permits it to escape slowly through an adjustable bleed orifice until the pressure has dropped to the point where the pressure control switch opens. The rate of bleed from the pressure control switch determines the time before pressure drops to the point where the control switch opens. Preferably a check valve is interposed in the connections from the electropneumatic valve to the pressure control device and is provided with a bypass conduit to the bleed orifice. This further lengthens the off period and shortens the on period of the pressure control device. It also smooths the operation.

2 Claims, 1 Drawing Figure

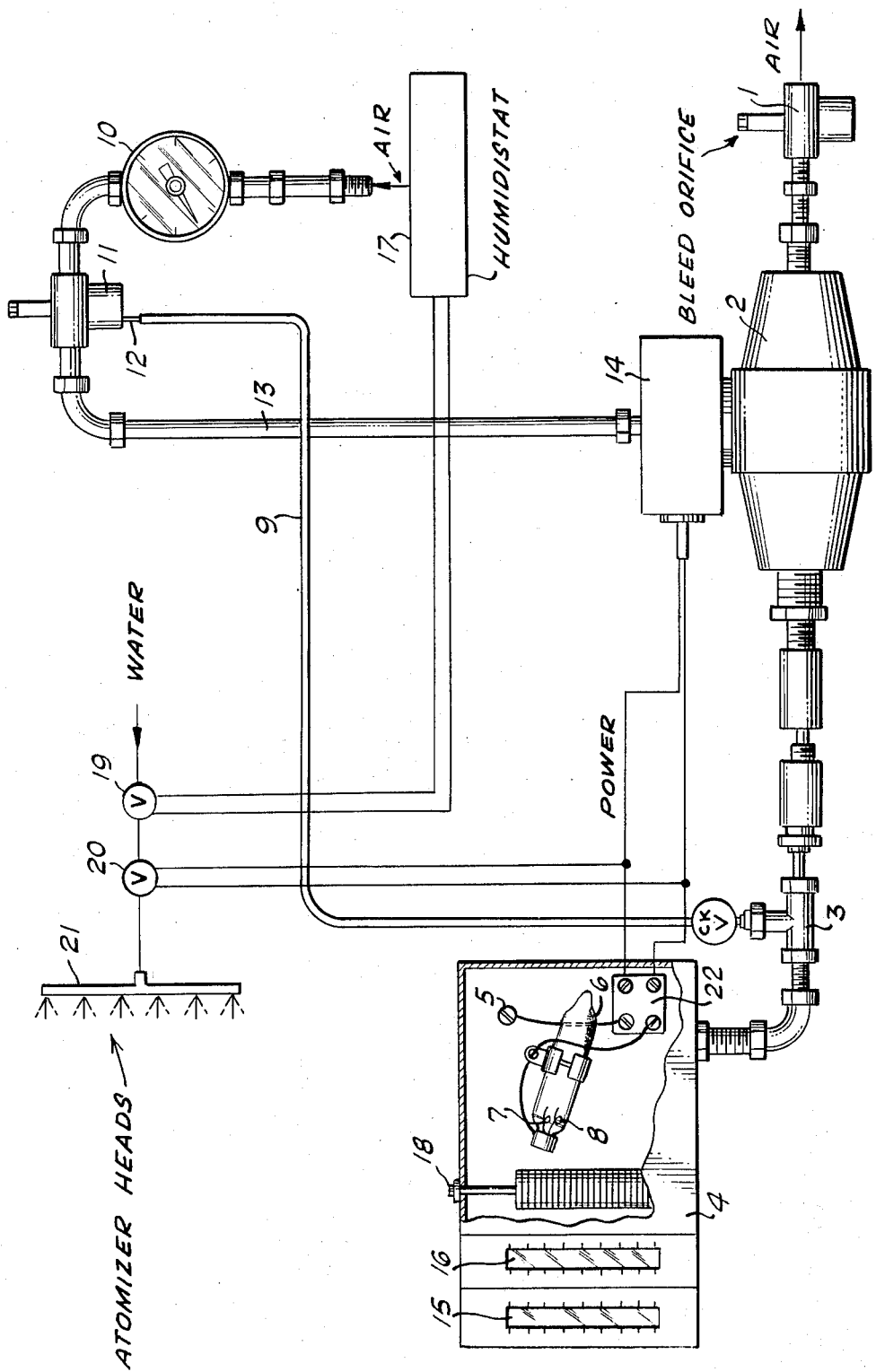

ATOMIZER INTERRUPTER

BACKGROUND OF THE INVENTION AND RELATED APPLICATION

The present application is a continuation-in-part of my prior co-pending application Ser. No. 213,396, filed Dec. 29, 1971, and which is now abandoned.

Control of the humidity in rooms, particularly those used in the textile industry, is normally effected by atomizing water into a stream of air. This atomization has to be intermittent, with fairly short periods, as otherwise the water may be atomized for too long a time to be fully vaporized by the stream of air, which is at ordinary room temperature. When vaporization is not complete, this results in water droplets, which produce what is called "wet down." This is a condition which is considered undesirable. It is normal for the humidity control to have two valves in series which control the periods of atomization. One of these valves is controlled by a conventional humidistat which opens the valve when the humidity has decreased to a lower set point and closes it when it has increased to a somewhat higher set point. The second valve in series is timed irrespective of the humidity sensed by the humidistat. The atomizers are only turned on when both valves in series are open, and the operation, therefore, is an ON and OFF operation which maintains humidity constant within the selected narrow range without producing wet down. A typical system of humidity control is described in the Buensod U.S. Pat. No. 2,562,375, July 31, 1951. This controls valves by air, but any other method of control can be used, such as electric control. The control by the humidistat is quite reliable but some problems arise when the timer control. It is difficult to adjust this control and to keep it in adjustment reliably. It is with an improved timer mechanism controlling the timed atomizer valve that the present invention deals.

SUMMARY OF THE INVENTION

The present invention deals only with the timer system which controls the timed atomizer valve, opening and closing it and as a result, of course, turning the water atomizers on and off because water will only flow through the atomizers or be blown through them, as is the mechanism of the Buensod patent, when both of the valves in series are open. Since the overall system and many of its parts, such as the conventional humidistat, atomizer heads and valves, may be of standard construction, their exact structure forms no part of the present invention and therefore they will be described and illustrated on the drawings in essentially diagrammatic form.

The present invention takes air from the humidistat and passes it through an electropneumatic valve or other control device which in one position permits the air to fill a conventional pressure control device, such as a rocking mercury switch, to a point at which the pressure is set to close the switch. Between the humidistat and the valve there is a restriction, which is adjustable and which determines the rate at which air will flow into the pressure control device and thus determines the period during which the control device switch is open. Preferably the timed valve opens when the control device switch is in its open position though it is possible to arrange the control so that the reverse takes place and either modification is included in the present invention. As pressure control devices are well known and are not essentially changed by the present invention, a typical rocking mercury switch, sold by the Honeywell Company under their name "Pressure Trol" is indicated. This control, which uses a rocking mercury switch, is only one type of control device and is used for illustrative purposes, the invention not being limited to this particular design of control switch.

When the pressure control device has slowly received sufficient air from the humidistat through the restriction to raise the pressure to the point at which the control switch is set, the switch closes, thus opening the timer controlled valve in the series of two valves to the atomizer heads. If at this time the humidistat senses humidity approximating the lower limit of the desired range, it will open its valve, and the two open valves in series permit water to be atomized until one or other of the two valves closes. The timer, of course, must be set for a time sufficient to permit atomization to maintain humidity in the range for which the humidistat is set. The closing of the switch also actuates the electropneumatic valve to connect to an adjustable bleed orifice so that the time during which the mercury switch is closed is determined. When the air bleeds out sufficiently to decrease the pressure below the pressure differential for which the control switch is set, the switch opens; the valve once more operates to permit air from the humidistat through the restriction to flow into the control device, and the timing cycle is repeated.

While the simple set-up described above operates satisfactorily and represents an improvement in humidity control, timing adjustment of the ON and off periods is somewhat critical, and so in a variant of the invention, which may be considered as a preferred embodiment, OFF periods are lengthened and ON periods are shortened, and operation made more smooth by a check valve between the electropneumatic valve and the pressure control device and a bypass conduit to the air from the humidistat. In the more detailed description and in the drawings below, this preferred variant will be described, but it should be understood that the invention in a broader aspect is not limited to the check valve and bypass of the preferred embodiment.

As has been pointed out above, the other elements of humidity control, such as the water atomizers, humidistat and the like, are not changed by the present invention. It is not necessary to design or to obtain special devices and this is an advantage of the present invention, which can use well known humidifying devices and humidistat and improve the smoothness and accuracy of their operation.

BRIEF DESCRIPTION OF THE DRAWINGS

The drawing is a semi-diagrammatic side elevation with the pressure control device partly broken away.

DESCRIPTION OF THE PREFERRED EMBODIMENT

Conventional atomizing structure, including atomizers (21), humidistat controlled valve (19) in series with timer controlled valve (20), receives water from a source so labeled. While this is a very common conventional type of humidity control, it should be noted that it is slightly different from the one in the Buensod patent referred to above in that the valves (19) and (20) control a flow of water whereas in Buensod the water is blown through by air. Both methods are well known and the details form no part of the present invention. Obviously, of course, the valves must be of suitable conventional design for the fluid flowing through them. Valve (19) is electrically controlled from humidistat (17) and valve (20) from the timing mechanism which will be described below. This also is slightly different from the Buensod patent, which controls the valves pneumatically instead of electrically.

The timing mechanism for valve (20) receives control air from the humidistat (17), which air is supplied by a separate air compressor so that the control air is always clean and dry. The separate compressor, which is, of course, a conventional piece of apparatus, is not shown. The dry air flows through a pressure gauge (10) to a T-connection in the form of an adjustable restriction (11) which is provided with a bleed opening (12). This restriction, which performs an essential function, may be of any suitable design, and the one illustrated is a T restriction, sold by the Honeywell Company. The restriction is adjustable, but as it is a standard item available on the market, the details of its inner construction are not shown, and so the illustration may be considered as semi-diagrammatic. The slow flow of air through the restriction (11) passes through a pipe (13) into an electropneumatic valve (2). This valve is also a standard item and is illustrated semi-diagrammatically of a shape corresponding to the valves sold by the Asco Company. The details of construction of the electropneumatic valve form no part of the present invention and any suitable valve may be used. The valve has two positions, which will be described further below, and is actuated by a solenoid, shown diagrammatically at (14).

When the solenoid (14) is not actuated, the valve (2) is in the position so that it permits the slow flow of air from the pipe (13) to pass through connections to a pressure control device (4), which is illustrated as the type sold by the Honeywell Company under their designation "Pressure Trol." Along the line to the pressure control there is a ball check valve (3) with a bypass tybe (9)' connecting to the restriction (11). The ball check valve is spring loaded and in one position connects to the tube (9) and in another position permits flow back through the valve (2), as will be described.

The pressure control device can be set, for example, for about four pounds, at which point the mercury bulb, described below, falls into the position of de-energizing the valve (2) and permitting air from the humidistat to flow through pipe (13) and into the pressure control (4). As the air flows into the pressure control device (4), pressure in the device builds up and finally reaches a pressure which has been pre-set by the adjustment (18). When the pressure reaches the pre-set figure, for example about eleven pounds, the mercury switch (5) rocks and the pool of mercury (6) flows back, making contact between the electrodes (7) and (8). This applies power to the solenoid (14). This goes through the electrical distributor, which, in the open position of the switch (5), also controls valve (20) so that in this position the valve is open. Since the valve (20) is in series with valve (19), which is controlled conventionally by the humidistat (17) and is, of course, opened when the humidistat shows low humidity and closed when it shows humidity at the upper edge of the range, the present invention shows improvements in the timer only. If while valve (20) is open valve (19) is also open for at least part of the time interval through which valve (20) is open, water will flow to the atomizers (21). This is normally the case, and the atomizers, therefore, are shut off when either valve (19) or valve (20) is closed. Valve (20), as has been described, is closed when the control switch (15) is in its closed position.

In the energized position valve (2) cuts off flow of air through the pipe (13) and permits air to flow back from the pressure control device through a second Honeywell T-restriction (1), the direction of air being indicated by the arrow. Adjustment of the T-restriction (1) determines the time when the atomizers are off. As has been described above, the atomizers are off when the control device (4) has a closed switch which closes the valve (20). In the open position, as described, if the valve (19) is also open the atomizers are on. When the pressure in the control device has dropped by the leaking of air, the mercury switch again rocks, the power from the solenoid (14) is shut off, and the cycle is repeated.

A typical example with three pounds air pressure, the control will stay on for 1½ minutes and off for 3 seconds. When pressure rises to approximately seven pounds from the humidistat, check valve (3) will begin to open, adding more air to the pressure device (4). This causes the mercury switch (6) to stay energized longer and to have the atomizer controls cut off for a longer period of time and reduces the time in the opposite condition. When the air pressure in (4) from the humidistat (17) reaches eleven pounds, the mercury switch rocks and through the solenoid (14) de-energizes the latter, permitting air from the controller (4) to bleed out through the restriction as has been described. The above figures are illustrative only, and adjustments can be made for different pressures depending on the operations of humidifying which are desired.

With the check valve operating, the valve (20) will be open or on for approximately 4 seconds and off the same time. If the zone is not over-atomized the control will balance itself out at from about six to eight pounds psi and will stay at this pressure, and humidity variation will flatten out.

1. In a humidity control system provided with humidistat and atomizers and humidistat controlled and timer controlled atomizer valves in series, the improvement in the timer controlling the time controlled valve which comprises, a. a pneumatic pressure control and switch actuated means thereto when a predetermined air pressure differential builds up in the control, the timer controlled atomizer valve in series being controlled by the position of the switch actuated means, b. an electropneumatic valve and means for connecting air from the humidistat through a restricted orifice to the pressure control, whereby a slow flow of air passes into the control in one position of the valve, c. means actuated by the closure of the pressure control switch to operate the electropneumatic valve into a second position, and d. a restricted bleed orifice and means connecting the pressure control through the valve thereto, whereby on closing of the control switch air slowly bleeds out until the differential air pressure in the control reaches a value causing the control switch to open, thereby initiating another cycle of operation.

2. A system according to claim 1 in which the connection from the electropneumatic valve to the pressure control includes a check valve which permits air to pass toward the control but prevents it passing in the opposite direction, connecting means from the restricted orifice to the check valve through a bypass conduit, whereby longer and smoother operation cycles of the pressure controller results.

* * * * *